(12) United States Patent
Ishii

(10) Patent No.: US 7,839,730 B2
(45) Date of Patent: Nov. 23, 2010

(54) OPTICAL PICKUP AND OPTICAL DISK DRIVE APPARATUS

(75) Inventor: Kazuyoshi Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 308 days.

(21) Appl. No.: 12/196,797

(22) Filed: Aug. 22, 2008

(65) Prior Publication Data

US 2009/0073855 A1 Mar. 19, 2009

(30) Foreign Application Priority Data

Sep. 13, 2007 (JP) .............................. 2007-237862

(51) Int. Cl.
*G11B 7/00* (2006.01)
(52) U.S. Cl. ................................................. 369/44.14
(58) Field of Classification Search ... 369/44.14–44.22; 359/808, 811, 819
See application file for complete search history.

(56) References Cited

U.S. PATENT DOCUMENTS

| | | | | |
|---|---|---|---|---|
| 5,781,351 | A * | 7/1998 | Murakami et al. | 359/819 |
| 7,286,448 | B2 * | 10/2007 | Suzuki et al. | 369/44.14 |
| 7,301,713 | B2 | 11/2007 | Yamamoto et al. | 359/820 |
| 7,468,849 | B2 | 12/2008 | Yamamoto et al. | 359/811 |
| 2005/0030841 | A1 * | 2/2005 | Lee et al. | 369/44.15 |
| 2005/0073755 | A1 | 4/2005 | Takeo et al. | 359/819 |
| 2005/0281148 | A1 | 12/2005 | Ishii | 369/44.14 |
| 2006/0056074 | A1 | 3/2006 | Yamamoto et al. | 359/796 |
| 2006/0072210 | A1 | 4/2006 | Chang | 359/661 |
| 2006/0087932 | A1 | 4/2006 | Hayashi et al. | 369/44.14 |
| 2006/0209639 | A1 * | 9/2006 | Bammert et al. | 369/18 |
| 2006/0233090 | A1 | 10/2006 | Ishii | 369/112.08 |
| 2008/0013413 | A1 | 1/2008 | Ishii et al. | 369/44.14 |
| 2008/0056101 | A1 | 3/2008 | Hatano | 369/112.24 |
| 2008/0094737 | A1 | 4/2008 | Yamamoto et al. | 359/822 |
| 2008/0253002 | A1 | 10/2008 | Yamamoto et al. | 359/820 |

(Continued)

FOREIGN PATENT DOCUMENTS

EP 1 895 525 A2 3/2008

(Continued)

OTHER PUBLICATIONS

English translation of Notification of Reason for Refusal issued by the Japanese Patent Office on Jun. 9, 2009, in Japanese patent application No. 2007-273862.

(Continued)

*Primary Examiner*—Thang V Tran
(74) *Attorney, Agent, or Firm*—Fitzpatrick, Cella, Harper & Scinto

(57) ABSTRACT

An optical pickup includes an objective lens, a protection member for protecting the objective lens, and a lens holding member configured to hold these members. The optical pickup records and/or reproduces an information signal on and/or from an optical recording medium by condensing laser light through the objective lens. The protection member includes a bearing surface to contact a surface of an edge portion of the objective lens not facing the optical recording medium, an aperture to control a diameter of laser light to be incident on the objective lens, and a protection portion protruding toward the optical recording medium with respect to the objective lens. The bearing surface, the aperture, and the protection portion are integrally formed with one another.

4 Claims, 7 Drawing Sheets

U.S. PATENT DOCUMENTS

2009/0073855 A1    3/2009    Ishii

FOREIGN PATENT DOCUMENTS

| | | |
|---|---|---|
| JP | 64-42521 | 2/1989 |
| JP | 5-101429 | 4/1993 |
| JP | 10-320802 | 12/1998 |
| JP | 2001-67700 | 3/2001 |
| JP | 2002-269790 | 9/2002 |
| JP | 2005-108365 | 4/2005 |
| JP | 2006-85837 | 3/2006 |
| JP | 2006-120246 | 5/2006 |
| JP | 2006-302338 | 11/2006 |
| JP | 2008-59659 | 3/2008 |
| JP | 2008-243251 | 10/2008 |
| JP | 2009-070479 A | 4/2009 |
| JP | 4378403 B2 | 12/2009 |

OTHER PUBLICATIONS

Japanese Office Action dated Jun. 9, 2009, issued in corresponding Japanese patent application No. 2007-237862.
*Abstract for JP 10-42521.

* cited by examiner

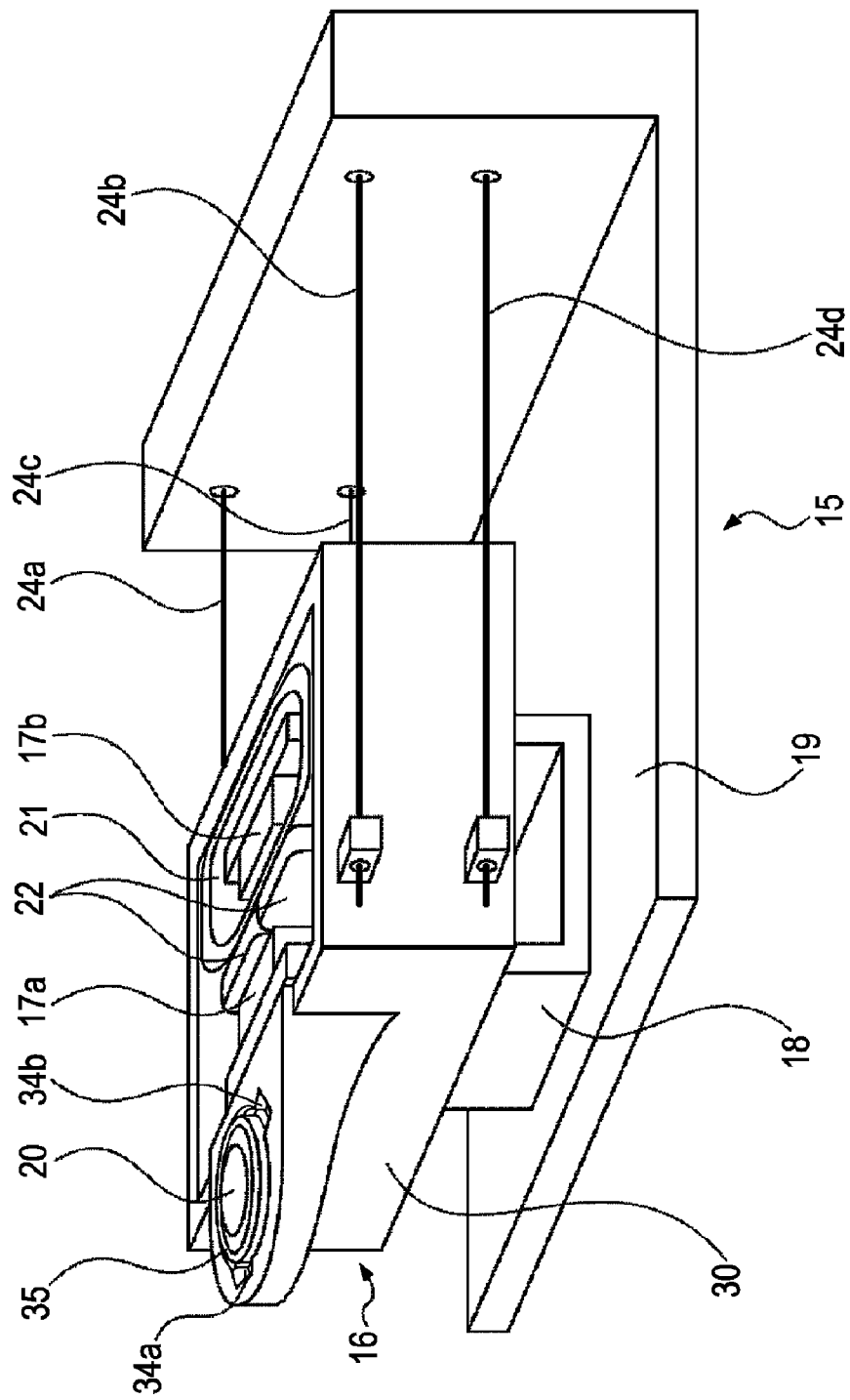

OPTICAL PICKUP AND OPTICAL DISK DRIVE APPARATUS

BACKGROUND OF THE INVENTION

1. Field of the Invention

The present invention relates to an optical pickup and an optical disk drive apparatus used to record and/or reproduce an information signal on and/or from an optical disk as an optical recording medium, by irradiating the optical disk with laser light.

2. Description of the Related Art

FIG. 8 shows a brief configuration of an optical disk drive apparatus 100 according to a related art. Here, reference numeral 1 denotes an optical disk, 2 denotes an optical pickup, and 3 denotes a spindle motor that rotationally drives the optical disk 1. The optical pickup 2 includes a laser source 6, a collimator lens 7, a beam splitter 8, a condensing lens 9, a photodetector 10, an objective lens 20, and an actuator 11 for performing focusing control and tracking control of the objective lens 20.

The optical disk 1 includes a substrate 12, an information signal recording layer 13, and a cover layer 14. The information signal recording layer 13 is formed on the substrate 12, and is made of a phase change material in which a phase condition is reversibly changeable. The cover layer 14 is made of a transparent resin material and has a thickness of about 0.1 mm. The information signal recording layer 13 has a spiral recording track or a concentric recording track. The information signal recording layer 13 may be made of a magneto-optical recording material, or a metal reflection film having pits (irregularities) formed therein. The optical pickup 2 is arranged to face the cover layer 14 of the optical disk 1.

FIG. 6 shows a configuration of the actuator 11. The actuator 11 includes a fixed portion 15 and a movable portion 16. The fixed portion 15 includes permanent magnets 17a and 17b, a yoke 18, and a support base 19. The movable portion 16 includes the objective lens 20, a focusing coil 21, and a tracking coil 22, as well as a lens holding member 23 that holds these components. Elastic supporting members 24a, 24b, 24c, and 24d are linear, elastic, and highly conductive, first ends of which are fixed to the support base 19, and second ends of which are retained at the movable portion 16. The elastic supporting members 24a, 24b, 24c, and 24d retain the movable portion 16, such that the movable portion 16 is movable in a direction perpendicular to the optical disk 1, and in a radial direction of the optical disk 1. Also, the elastic supporting members 24a, 24b, 24c, and 24d are electrically connected with the focusing coil 21 and the tracking coil 22 on the lens holding member 23.

Referring back to FIG. 8, the optical disk drive apparatus 100 also includes an error signal generating circuit 4 and a control circuit 5 for performing the focusing control and the tracking control of the actuator 11. The control circuit 5 supplies the focusing coil 21 and the tracking coil 22 with control current through the elastic supporting members 24a, 24b, 24c, and 24d (shown in FIG. 6).

To record an information signal, the optical disk 1 is rotationally driven by the spindle motor 3. In this state, laser light emitted from the laser source 6 and modulated into a pulse form is collimated by the collimator lens 7. The beam splitter 8 transmits the collimated laser light, and the objective lens 20 converges the laser light, so as to be condensed into a very small light spot on the information signal recording layer 13 through the cover layer 14 of the optical disk 1.

The information signal recording layer 13 of the optical disk 1 is repeatedly heated or cooled through irradiation of pulse-modulated laser light. Because of the difference between the processes, a recording mark whose phase condition is changed into an amorphous phase or a crystal phase is formed as an information signal.

To reproduce a recorded information signal, the optical disk 1 is rotationally driven by the spindle motor 3, similarly. In this state, the optical disk 1 is irradiated with laser light, with a constant intensity emitted from the laser source 6, through the cover layer 14 of the optical disk 1, so as to be condensed into a very small light spot on the information signal recording layer 13. The intensity of reflection light from the information signal recording layer 13 at this time varies in accordance with a recording mark, and an information signal is thus reproduced.

During a recording or reproducing operation of the information signal, the light beam reflected by the optical disk 1 is reflected by the beam splitter 8, condensed by the condensing lens 9, and detected by the photodetector 10. The photodetector 10 has a plurality of divided photo-detecting surfaces. The error signal generating circuit 4 generates a focusing error signal and a tracking error signal on the basis of a detection signal from each photo-detecting surface.

The control circuit 5 supplies the focusing coil 21 and the tracking coil 22 with control current based on the focusing error signal and the tracking error signal, through the elastic supporting members 24a, 24b, 24c, and 24d. The actuator 11 drives the movable portion 16 in a direction perpendicularly toward or away from the optical disk 1, and in a radial direction orthogonal to the recording track, by using an electromagnetic force generated between the control current and magnetic flux caused by the permanent magnets 17a and 17b.

Even when the optical disk 1 is perpendicularly displaced due to face deflection, the focusing control is performed so that the laser light is accurately condensed into the light spot on the recording track, to follow the displacement. Also, even when the recording track is displaced in the radial direction due to eccentricity, the tracking control is performed so that the laser light scans the recording track to follow the displacement.

An operating distance (clearance between the objective lens 20 and the surface of the cover layer 14) tends to be decreased as the numerical aperture (NA) of the objective lens 20 is increased. In addition, reduction in size of the objective lens 20 is desired in association with a demand for a reduction in size of the optical disk drive apparatus. The operating distance, which has been 0.8 mm or larger, is desired to be reduced to 0.2 to 0.3 mm.

When the actuator 11 normally performs the focusing control, the operating distance is constantly kept between the objective lens 20 and the surface of the cover layer 14. However, in some cases, the control of the actuator 11 is not performed normally, for example, when an impact or a vibration is applied to the apparatus from the outside, in a non-operating state, in which the control of the actuator 11 is suspended. Also, in some cases, a normal error signal is not obtained at the start of the control operation or during the control operation, when being affected by an impact or a vibration applied from the outside, or due to contamination on, or damage to, the optical disk 1. In such a case, the movable portion 16 may be excessively displaced, and approach the optical disk 1. Ultimately, the movable portion 16 may contact the optical disk 1. Regarding actual assembly accuracy of the apparatus, it is difficult to provide a mechanism, such as a stopper, for regulating the excessive displacement of the movable portion 16 at an intermediate position of the operating distance.

Thus, it is difficult to always completely prevent the contact of the movable portion with the optical disk 1, as a result of the excessive displacement of the movable portion 16. Even when the contact occurs, it is at least necessary to take a countermeasure to prevent the direct contact between the objective lens 20 and the optical disk 1, so as to prevent the objective lens 20 and the optical disk 1 from being damaged. Otherwise, recording or reproducing performance of an information signal deteriorates significantly.

As such a countermeasure, Japanese Patent Laid-Open No. 10-320802 discloses an example in which a ring-like protection member is provided at the periphery of an objective lens to protrude toward an optical disk from the objective lens.

FIG. 7 is a cross-sectional view showing a configuration of an objective lens holding portion described in the above publication. An objective lens 20 is mounted in a mounting hole 26 formed at a lens holding member 23, such that a lower surface 25b of an edge portion 25 contacts a bearing surface formed at the periphery of the mounting hole 26. Also, a protection member 27 is mounted on an upper surface 25a of the edge portion 25.

The protection member 27 is made of a soft resin material, an upper surface of which is higher than at least a vertex of a curved surface of the objective lens 20, and is at a height less than the operating distance. Hence, in a normal control operation, the protection member 27 would not contact the optical disk 1. When a movable portion is excessively displaced, and approaches the optical disk 1 in a condition other than a normal operation, although the protection member 27 contacts the optical disk 1, the objective lens 20 is protected without directly contacting the optical disk 1.

In such a case, as the frequency of contact between the protection member and the optical disk increases, the protection member is subjected to wear or is damaged, and would lose its protection function for the objective lens with time. The surface of the cover layer of the optical disk may be damaged similarly, and hence normal recording and/or reproducing of an information signal may become difficult. To avoid this, and to allow the protection member to be used for a long term, the height of the protection member should be minimized, to fall in a range of the operating distance of the objective lens, to reliably protect the objective lens. Meanwhile, a sufficient clearance should be provided between the protection member and the optical disk, to minimize the frequency of contact with the cover layer.

As described above, a protruding distance of the protection member from the objective lens is necessary to be within a predetermined range. If the protruding distance is above the upper limit, the frequency of contact between the protection member and the optical disk is increased, and hence, damage of not only the protection member, but also, the optical disk, may be expected.

In contrast, if the protruding distance is below the lower limit, the objective lens may directly contact the optical disk as a result of wear of the protection member, and an adhering substance on the optical disk may contact the objective lens.

For example, when an objective lens has an NA of about 0.65, and an operating distance of 0.8 mm or larger, the objective lens can be protected, as long as a protruding distance of a protection member from the objective lens is within a relatively wide range (for example, within a range of from 0.05 to 0.65 mm). Also, a sufficient clearance can be provided between the protection member and the optical disk.

For another example, when an objective lens has an NA of about 0.85, and an operating distance of 0.3 mm, a protruding distance of a protection member from the objective lens has to be within a relatively narrow range, for example, within a range of from 0.05 to 0.15 mm.

In this way, as the NA is increased due to an increase in density of the optical disk, the protruding distance of the protection member from the objective lens has to be within the narrow range.

However, the extremely thin, sheet-like protection member as in the related art is soft, and its intensity is not sufficient. Hence, the surface of the protection member is uneven, because the protection member is deformed when being bonded, resulting in the height thereof being uneven. The protection member and the adhesive have uneven thicknesses. Therefore, it has been extremely difficult to bring the height of the protection member within the narrow range.

SUMMARY OF THE INVENTION

Accordingly, the present invention provides an optical pickup and an optical disk drive apparatus capable of protecting an objective lens, by providing a smooth protection member, without an adhesive applied on an upper surface of an edge portion of the objective lens.

In particular, according to one aspect of the present invention, an optical pickup includes an objective lens, a protection member for the objective lens, and a lens holding member configured to hold the objective lens and the protection member. The protection member includes a bearing surface configured to contact a surface of an edge portion of the objective lens not facing an optical recording medium, an aperture configured to control a diameter of laser light to be incident on the objective lens, and a protection portion protruding toward the optical recording medium with respect to the objective lens, the bearing surface, the aperture, and the protection portion being integrally formed with one another.

Further features of the present invention will become apparent from the following description of exemplary embodiments, with reference to the attached drawings.

BRIEF DESCRIPTION OF THE DRAWINGS

FIG. 1 is an illustration showing a configuration of an actuator of an optical pickup according to an exemplary embodiment of the present invention.

DESCRIPTION OF THE EMBODIMENTS

Figure 8:
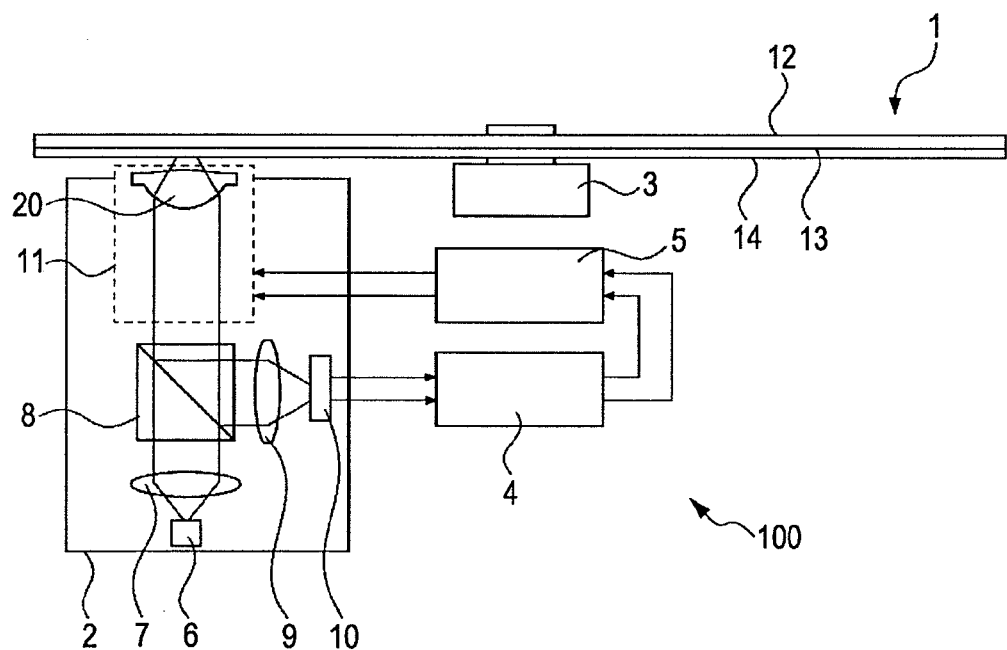
FIG. 8 is an illustration showing a configuration of an optical disk drive apparatus according to an exemplary embodiment of the present invention.

An optical pickup according to an exemplary embodiment of the present invention will be described below. The optical pickup records an information signal by condensing laser light from a laser source into a very small light spot through an objective lens on an information signal recording layer of an optical disk. Or, the optical pickup reproduces an information signal recorded in an optical disk by using reflection light from the optical disk. An optical disk drive apparatus has the following configuration, which includes the optical pickup mounted thereon, as shown in FIG. 8. Reference numeral 1 denotes an optical disk, 2 denotes an optical pickup, and 3 denotes a spindle motor that rotationally drives the optical disk 1. The optical pickup 2 includes a laser source 6, a collimator lens 7, a beam splitter 8, a condensing lens 9, a photodetector 10, an objective lens 20, and an actuator 11 for effecting focusing control and tracking control of the objective lens 20.

The details of the optical disk drive apparatus and the optical pickup mounted on the optical disk drive apparatus are similar to those shown in FIG. 8, and described above in the Description of the Related Art section, and hence, any additional description is omitted. Here, the actuator 11, which is the feature of the present invention, is described in detail.

FIG. 1 shows an example configuration of the actuator 11 of the optical pickup 2 according to the exemplary embodiment of the present invention. The actuator 11 includes a fixed portion 15 and a movable portion 16. The fixed portion 15 includes permanent magnets 17a and 17b, a yoke 18, and a support base 19. The movable portion 16 includes the objective lens 20, a focusing coil 21, and a tracking coil 22, as well as a lens holding member 30, which holds these components.

Elastic supporting members 24a, 24b, 24c, and 24d are linear, elastic, and highly conductive, first ends of which are fixed to the support base 19, and second ends of which retain the movable portion 16, such that the movable portion 16 is movable in a direction perpendicular to the optical disk 1 (optical recording medium), and in a radial direction of the optical disk 1. Also, the elastic supporting members 24a, 24b, 24c, and 24d are electrically connected with the focusing coil 21 and the tracking coil 22 on the lens holding member 30.

Referring back to FIG. 8, the optical disk drive apparatus also includes an error signal generating circuit 4 and a control circuit 5 for effecting the focusing control and the tracking control of the actuator 11. The control circuit 5 supplies the focusing coil 21 and the tracking coil 22 with control current through the elastic supporting members 24a, 24b, 24c, and 24d.

Both the objective lens 20, which condenses laser light on the optical disk 1, and a protection member 35, are bonded and fixed to bonding recesses 34a, 34b, and 34c (not shown) formed in the lens holding member 30. The protection member 35 houses the objective lens 20 therein, and a peripheral edge is located higher than the objective lens 20. When the movable portion 16 is excessively displaced, and approaches the optical disk 1 in a condition other than a normal operation, although an upper end surface of the peripheral edge of the protection member 35 contacts the optical disk 1, the objective lens 20 is protected, without directly contacting the optical disk 1.

A circular opening is formed at a bottom portion of the protection member 35. The circular opening also functions as an aperture that controls a diameter of laser light to be incident on the objective lens 20.

Specific embodiments of the protection member 35 will be described below. In any of the embodiments, it is assumed that an operating distance (distance between a vertex of a curved surface of the objective lens 20 and the optical disk 1) of the objective lens 20 is 0.25 mm. The height of the vertex of the curved surface of the objective lens 20 is equivalent to the height of an upper surface of an edge portion 25. A protruding distance of the protection member 35 from the vertex of the curved surface of the objective lens 20 is within a range of from 0.05 to 0.1 mm.

First Embodiment

Figure 2A:
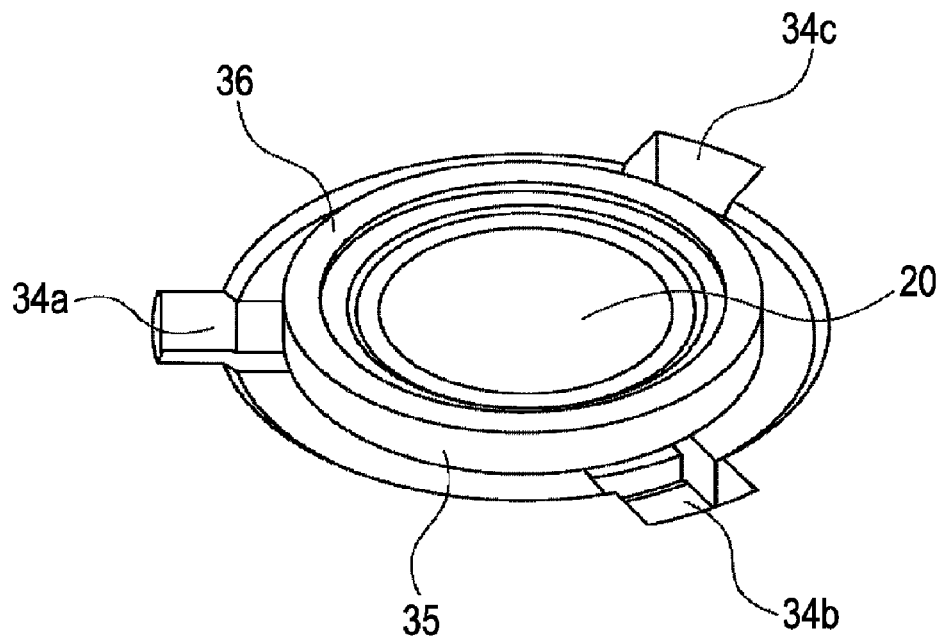
FIGS. 2A and 2B are illustrations showing a configuration of an objective lens holding portion according to a first embodiment of the present invention.
Figure 2B:
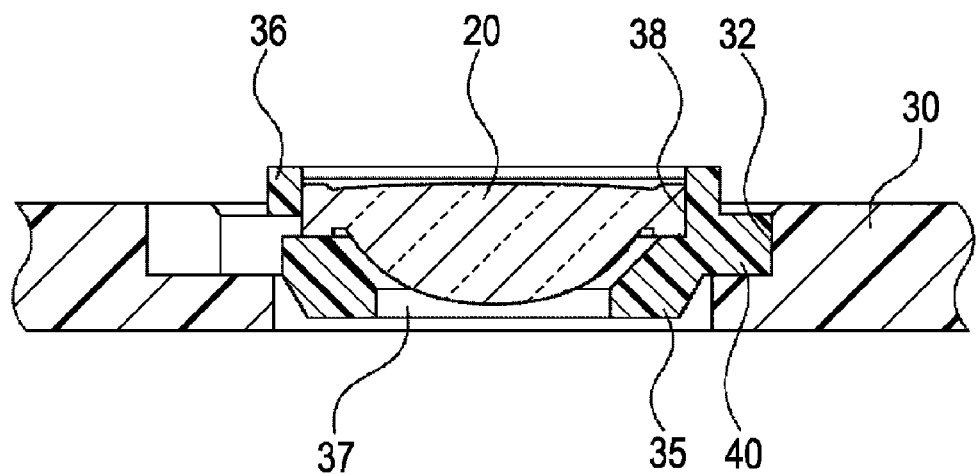
Figure 3A:
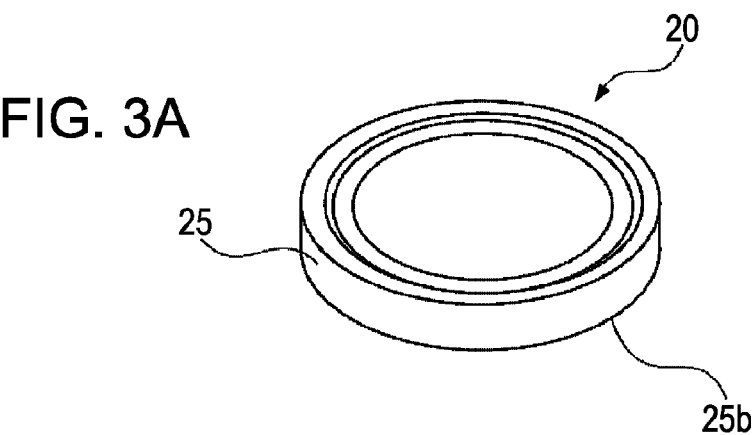
FIGS. 3A to 3C are illustrations showing appearances of components of the objective lens holding portion according to the first embodiment of the present invention.
Figure 3B:
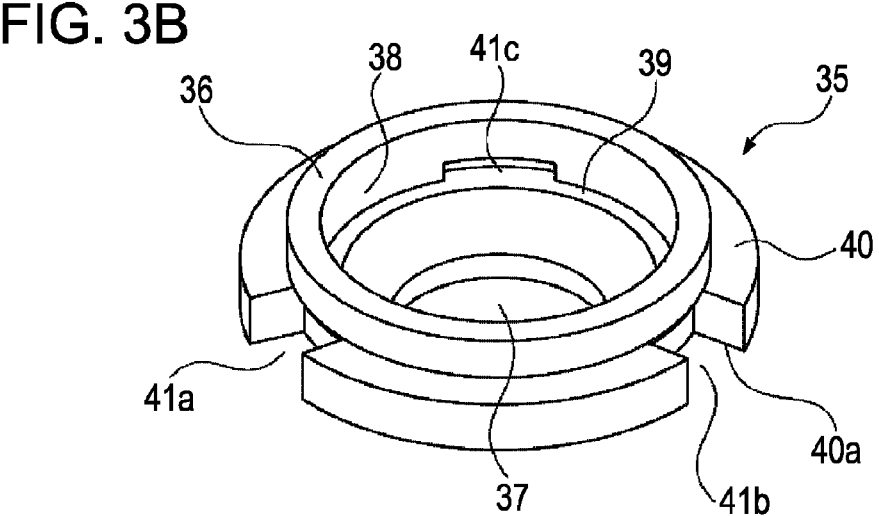
Figure 3C:
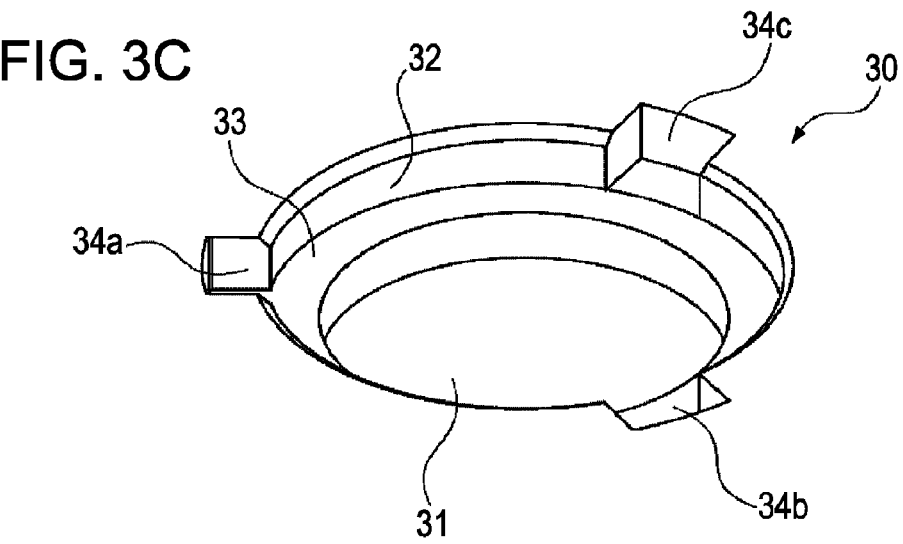

FIGS. 2A and 2B show a configuration of an objective lens holding portion, in an enlarged manner, according to a first embodiment of the present invention. FIG. 2A is a perspective view, and FIG. 2B is a cross-sectional view. FIG. 3A is a perspective view of the objective lens 20. FIG. 3B is a perspective view of the protection member 35. FIG. 3C is a partially enlarged perspective view of the lens holding member 30.

Referring to FIG. 3C, the lens holding member 30 has a mounting hole 31 in which the protection member 35 and the objective lens 20 are arranged. The objective lens 20 is mounted to the inside of the mounting hole 31 with the protection member 35 interposed therebetween. The lens holding member 30 is made of an extremely hard resin material, for example, a liquid crystal polymer, so as to prevent resonance from occurring during a focusing control operation and a tracking control operation. The protection member 35 is made of a resin material, for example, polyoxymethylene (POM), which is softer than the lens holding member, 30 and has a good sliding performance, so as to prevent the protection member 35 from being damaged by contact with the optical disk 1.

Referring to FIG. 3B, the protection member 35 has a cup-like shape. A fitting portion 38 having a ring-like bearing surface 39 is formed in the protection member 35. The edge portion 25 of the objective lens 20, shown in FIG. 3A, is fitted to the fitting portion 38, and a lower surface 25b of the edge portion 25 not facing the optical disk 1 contacts the bearing surface 39 for mounting. Accordingly, the accuracy of a mounting height and a center position of the objective lens 20 with respect to the protection member 35 can be increased. Also, a flange 40 is formed outside the protection member 35.

Referring to FIG. 3C, a fitting portion 32 having a ring-like bearing surface 33 is formed inside the mounting hole 31 of the lens holding member 30. The protection member 35 is mounted such that the flange 40 thereof is fitted to the fitting portion 32 of the lens holding member 30, and a lower surface 40a of the flange 40 contacts the bearing surface 33. Accordingly, the accuracy of a mounting height and a center position of the protection member 35 with respect to the lens holding member 30 can be increased.

Referring to FIG. 2B, an upper end surface of a peripheral edge 36 of the protection member 35 is arranged to be slightly higher than the vertex of the curved surface of the objective lens 20. When the movable portion 16 is excessively displaced and approaches the optical disk 1, the peripheral edge 36 contacts the optical disk 1, so as to prevent the objective lens 20 from directly contacting the optical disk 1. The height of the upper end surface of the peripheral edge 36 is within a predetermined range, for example, within a range of from 0.05 to 0.1 mm from the vertex of the curved surface of the objective lens 20.

Referring to FIGS. 3B and 3C, three bonding holes 41a, 41b, and 41c are formed in a side surface of the protection member 35 to penetrate through the protection member 35 to the inside thereof, whereas three bonding recesses 34a, 34b, and 34c are formed at the periphery of the mounting hole 31 of the lens holding member 30. For assembly, the positions of the bonding holes 41a, 41b, and 41c of the protection member 35 are aligned with the positions of the bonding recesses 34a, 34b, and 34c, and spaces defined by these portions are filled with an adhesive. Since the objective lens 20 is partially exposed to the inside of the bonding recesses 34a, 34b, and 34c, the protection member 35 and the objective lens 20 can be bonded to the lens holding member 30 at the same time. Hence, bonding and fixing is completed by a single bonding step.

Referring to FIG. 3B, a lower portion of the protection member 35 is tapered, and a circular opening 37 is formed at a bottom portion of the protection member 35. The opening 37 functions as an aperture that controls a diameter of laser light to be incident on the objective lens 20.

As described above, in this embodiment, the protection member 35 holds the objective lens 20, such that the lower surface 25b of the edge portion 25 of the objective lens 20 contacts the protection member 35. Thus, the protection member 35 is not restricted by the operating distance of the objective lens 20. Also, the protection member 35 does not require a thin portion, unlike the example described above in the Description of the Related Art. Accordingly, the protection member 35 may be manufactured by injection molding, thereby easily obtaining high dimensional accuracy. In addition, the protection member 35 is not a thin sheet, but has a three-dimensional cup-like shape. Accordingly, the strength of the protection member 35 is sufficient, and hence, the protection member 35 would not be deformed during a bonding step. Thus, the height of the peripheral edge 36 of the protection member 35 can be set within the above-mentioned range. As long as the bonding holes 41a, 41b, and 41c for bonding are provided at a lower portion of the side surface, the adhesive is prevented from adhering to the upper end surface of the peripheral edge 36, and from being bulged to become higher than the peripheral edge 36. Accordingly, manufacturing can be facilitated.

It is noted that a deviation between a center position of the opening 37, functioning as the aperture formed at the protection member 35 and a center position of the objective lens 20, may result in unevenness of a light intensity distribution of a light spot formed with the objective lens 20. Hence, it is important to highly accurately align the respective center positions with each other. In this embodiment, since the aperture is integrally formed at the protection member 35 to which the objective lens 20 is fitted, the accuracy of the center position can be increased, and thus, the uniform light intensity distribution can be obtained.

Alternatively, unlike the embodiment in which the aperture is integrally formed at the protection member, it may be assumed that an aperture is integrally formed at a lens holding member, and that a protection member, having a bearing surface contacting a lower surface of an edge portion of an objective lens, is mounted to the lens holding member. In this case, a lens mounting portion (portion located below the bearing surface) of the protection member is arranged directly below the objective lens. Further, the aperture of the lens holding member has to be arranged below the lens mounting portion in a superposed manner. Thus, the thickness of the entire movable portion is increased. Owing to this, it is desirable that the aperture is integrally formed at the protection member.

Second Embodiment

Figure 4A:
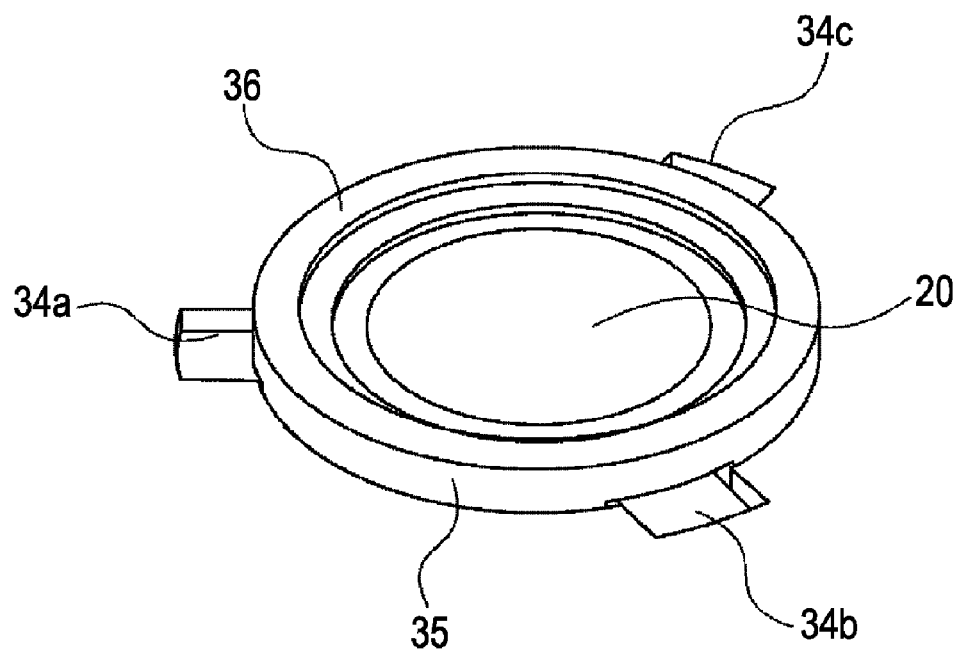
FIGS. 4A and 4B are illustrations showing a configuration of an objective lens holding portion according to a second embodiment of the present invention.
Figure 4B:
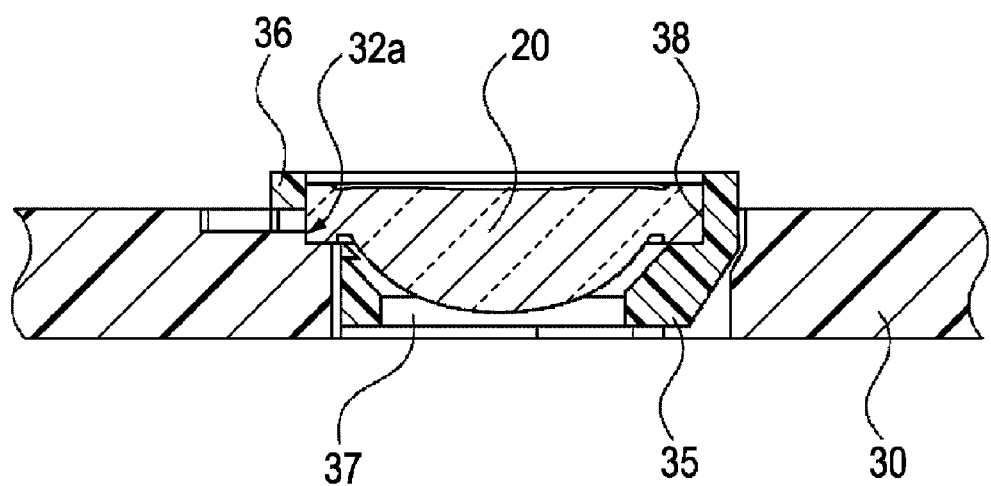
Figure 5A:
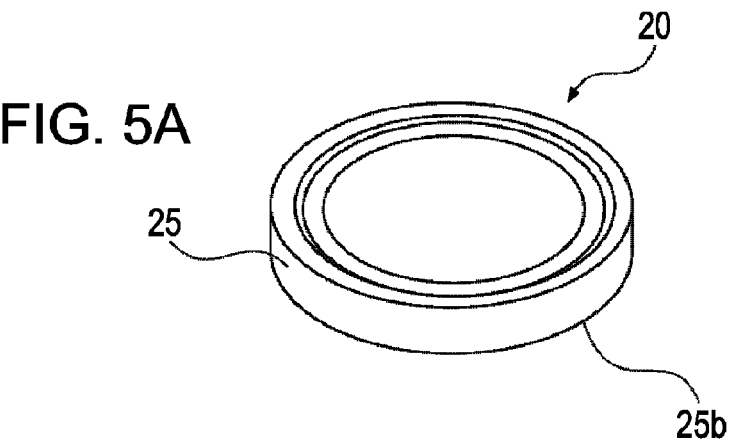
FIGS. 5A to 5C are illustrations showing appearances of components of the objective lens holding portion according to the second embodiment of the present invention.
Figure 5B:
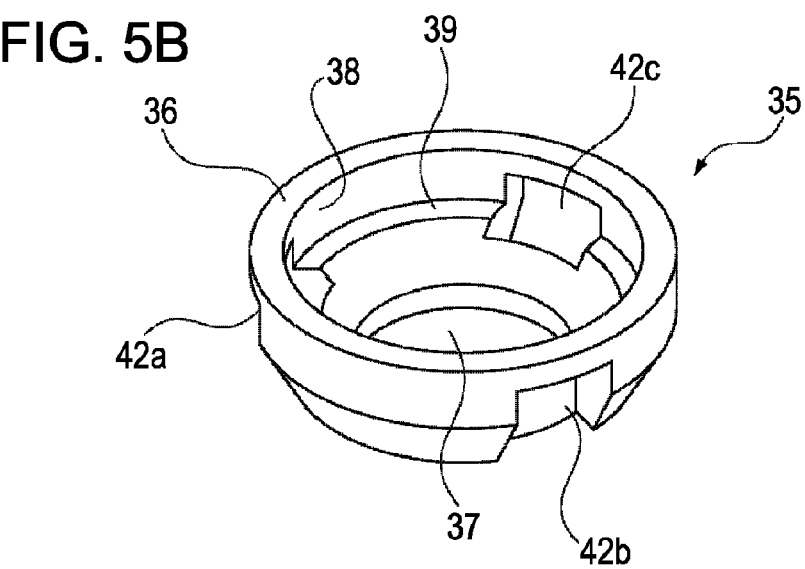
Figure 5C:
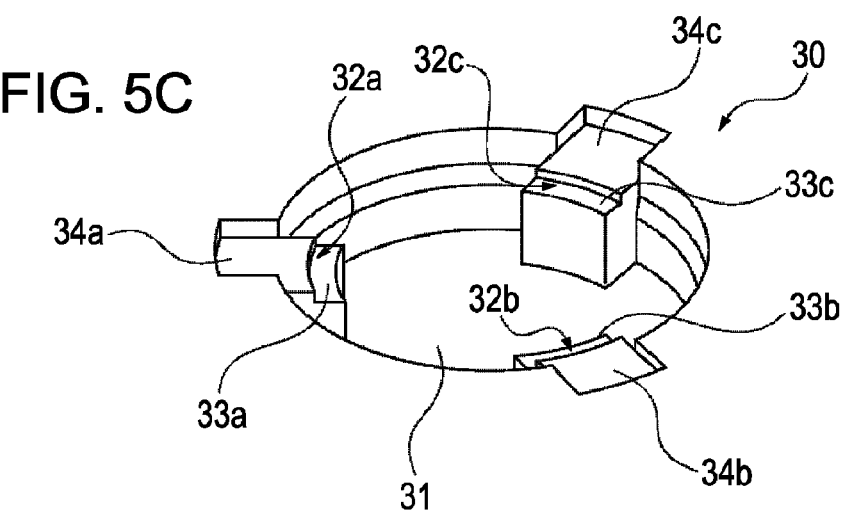
Figure 6:
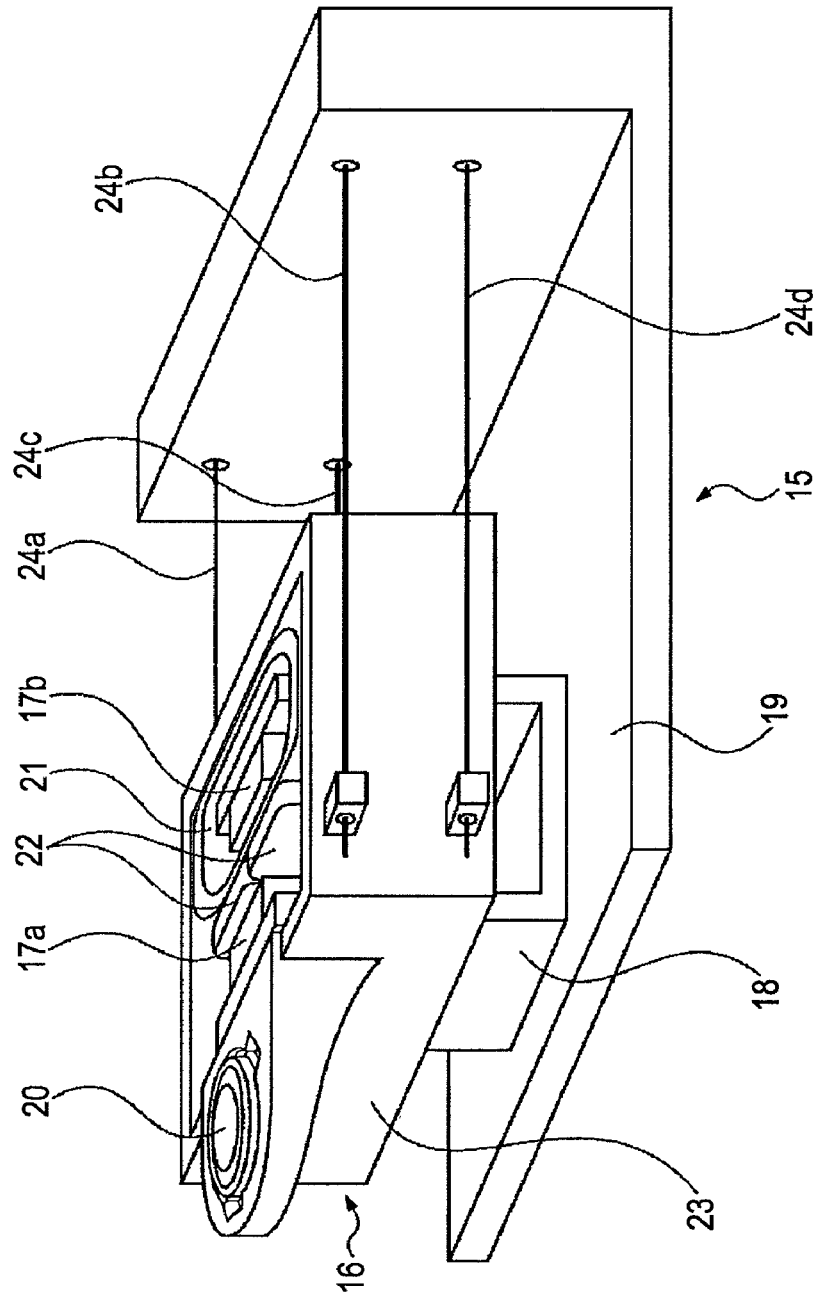
FIG. 6 is an illustration showing a configuration of an actuator of an optical pickup according to a related art.
Figure 7:
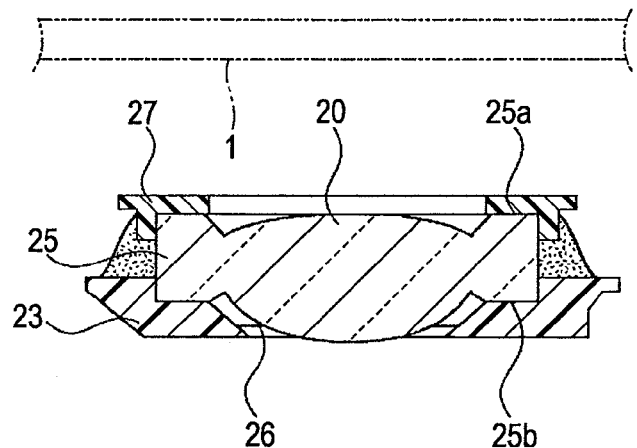
FIG. 7 is a cross-sectional illustration showing a configuration of an objective lens holding portion of the optical pickup according to the related art.

FIGS. 4A and 4B show a configuration of an objective lens holding portion in an enlarged manner, according to a second embodiment of the present invention. FIG. 4A is a perspective view, and FIG. 4B is a cross-sectional view. FIG. 5A is a perspective view of the objective lens 20. FIG. 5B is a perspective view of the protection member 35. FIG. 5C is a partially enlarged perspective view of the lens holding member 30. This embodiment is different from the first embodiment, regarding the mounting structure of the objective lens 20 and the protection member 35 with respect to the lens holding member 30.

Referring to FIG. 5C, the lens holding member 30 has a mounting hole 31, in which the protection member 35 and the objective lens 20 are arranged. The protection member 35 and the objective lens 20 are mounted to the inside of the mounting hole 31.

Referring to FIG. 5B, the protection member 35 has a cup-like shape. A fitting portion 38 having a ring-like bearing surface 39 is formed in the protection member 35. The edge portion 25 of the objective lens 20, shown in FIG. 5A, is fitted to the fitting portion 38, and a lower surface 25b not facing the optical disk 1 contacts the bearing surface 39 for mounting. Accordingly, the accuracy of a mounting height and a center position of the objective lens 20 with respect to the protection member 35 can be increased.

Referring to FIG. 4B, an upper end surface of a peripheral edge 36 of the protection member 35 is arranged to be slightly higher than a vertex of a curved surface of the objective lens 20. When the movable portion 16 is excessively displaced, and approaches the optical disk 1, the peripheral edge 36 contacts the optical disk 1 so as to prevent the objective lens 20 from directly contacting the optical disk 1. The height of the upper end surface of the peripheral edge 36 is within a predetermined range, for example, within a range of from 0.05 to 0.1 mm from the vertex of the curved surface of the objective lens 20.

Referring to FIGS. 5B and 5C, three cut portions 42a, 42b, and 42c are formed at the periphery of the protection member 35 to allow the edge portion 25 of the objective lens 20 to be partially exposed. Also, three fitting portions 32a, 32b, and 32c having bearing surfaces 33a, 33b, and 33c are formed at the periphery of the mounting hole 31 so as to protrude toward the inside of the lens holding member 30. The edge portion 25 of the objective lens 20 is fitted to the fitting portions 32a, 32b, and 32c at the cut portions 42a, 42b, and 42c of the protection member 35, and a lower surface 25b of the objective lens 20 contacts the bearing surfaces 33a, 33b, and 33c for mounting. Accordingly, the accuracy of a mounting height and a center position of the objective lens 20 with respect to the lens holding member 30 can be increased.

It is noted that a deviation between a center position of the objective lens 20 and the center of laser light to be incident on the objective lens 20 may result in unevenness of a light intensity distribution of a light spot formed with the objective lens 20. Hence, it is important to highly accurately align the respective center positions with each other. This embodiment is different from the first embodiment in that the aperture is integrally formed at the protection member 35 to which the objective lens 20 is fitted, and also, that the objective lens 20 is directly positioned at the lens holding member 30. In the first embodiment, the objective lens 20 is indirectly positioned at the lens holding member 30 with the protection member 35 interposed therebetween. With the configuration of this embodiment, the positional accuracy of the objective lens 20 in the movable portion 16 can be further increased, and even the positional accuracy of the objective lens 20 with respect to the support base 19 can be increased. When the support base 19 of the actuator 11 is mounted to an optical system with high accuracy, the center position of the objective lens 20 can be highly accurately aligned with the center of the incident laser light accordingly. Thus, the uniform light intensity distribution can be obtained.

In addition, the lens holding member 30 has the three bonding recesses 34a, 34b, and 34c formed at the periphery of the mounting hole 31. For assembly, the positions of the cut portions 42a, 42b, and 42c of the protection member 35 are aligned with the positions of the bonding recesses 34a, 34b, and 34c, and spaces defined by these portions are filled with an adhesive. Since the objective lens 20 is partially exposed to the inside of the bonding recesses 34a, 34b, and 34c, the protection member 35 and the objective lens 20 can be bonded to the lens holding member 30 at the same time. Hence, bonding and fixing is completed by a single bonding step.

In the bonding step, it is desirable that a surface of the protection member 35 to be bonded with the adhesive filled in the bonding recess is a surface perpendicular to a surface thereof facing an optical recording medium, and a surface of the edge portion 25 of the objective lens 20 to be bonded with the adhesive is a surface perpendicular to a surface thereof facing the optical recording medium. This is because the influence of the thickness of the adhesive can be reduced in an optical-axis direction.

Referring to FIG. 5B, the lower portion of the protection member 35 is tapered, and a circular opening 37 is formed at the bottom portion of the protection member 35. The opening 37 functions as an aperture that controls a diameter of laser light to be incident on the objective lens 20.

As described above, also in this embodiment, the protection member 35 holds the objective lens 20, such that the lower surface 25b of the edge portion 25 of the objective lens 20 contacts the protection member 35. Thus, the protection member 35 is not restricted by the operating distance of the objective lens 20. Also, the protection member 35 does not need a thin portion, unlike the example described above in the Description of the Related Art. Accordingly, the protection member 35 may be manufactured by injection molding, thereby easily obtaining high dimensional accuracy. In addition, the protection member 35 is not a thin sheet, but has a three-dimensional cup-like shape. Accordingly, the strength of the protection member 35 is sufficient, and hence, the protection member 35 would not be deformed during a bonding step. Thus, the height of the peripheral edge 36 of the protection member 35 can be set within the above-mentioned range. As long as the cut portions 42a, 42b, and 42c for bonding are provided at a lower portion of the side surface, the adhesive is prevented from adhering to the upper end surface of the peripheral edge 36, and from being bulged to become higher than the peripheral edge 36. Accordingly, manufacturing can be facilitated.

As described in the embodiments, in the optical pickup, the accuracy of the height of the protection member 35 with respect to the objective lens 20 can be increased. Accordingly, the protruding distance of the protection member 35 from the vertex of the curved surface of the objective lens 20 may be within a sufficiently narrow range. For example, the protruding distance may be within a range of from 0.05 to 0.1 mm. Accordingly, even when the operating distance of the objective lens 20 is about 0.25 mm, the objective lens 20 can be prevented from directly contacting the optical disk 1, a sufficient clearance is provided between the protection member 35 and the optical disk 1, and the frequency of contact can be minimized. Thus, the protection member 35 can be used for a long term.

Also, in the optical pickup, since the aperture is integrally formed at the protection member 35, to which the objective lens 20 is fitted, the accuracy of the center position can be increased, and thus, the uniform light intensity distribution can be obtained.

While a portion of the edge portion 25 of the objective lens 20 is positioned directly to the protection member 35, in the second embodiment, other portion of the edge portion 25 may be also directly positioned to the lens holding member 30. The positional accuracy of the objective lens 20 in the movable portion 16 can be increased. Further, the positional accuracy of the objective lens 20 to the support base 19 can be increased. Accordingly, the uniform light intensity distribution can be obtained.

As described above, with the optical pickup according to any of the embodiments, the adhesive is not provided on the upper surface of the edge portion of the objective lens facing the optical disk. Accordingly, the surface smoothness of the protection member that protects the objective lens can be kept unchanged. Thus, a sufficient clearance can be provided between the protection member and the optical disk, and the frequency of contact between the protection member and the optical disk can be minimized. Hence, the protection member can be used for a long term.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

Except as otherwise discussed herein, the various components shown in outline or in block form in the Figures are individually well known and their internal construction and operation are not critical either to the making or using, or to a description of the best mode of the invention.

This application claims the benefit of Japanese Application No. 2007-237862 filed Sep. 13, 2007, which is hereby incorporated by reference herein in its entirety.

What is claimed is:

1. An optical pickup comprising:
   (1) an objective lens; and
   (2) a lens holding member configured to hold the objective lens and a protection member for protecting the objective lens,
   wherein the lens holding member comprises:
      (a) a first fitting portion configured to fit to an edge portion of the objective lens;
      (b) a first bearing surface configured to contact a surface of the edge portion of the objective lens not facing an optical recording medium; and
      (c) a bonding recess configured to bond the objective lens,
   wherein the protection member includes the following elements (i) to (v), which are integrally formed with one another:
      (i) a second fitting portion configured to fit to the edge portion of the objective lens;
      (ii) a second bearing surface configured to contact the surface of the edge portion of the objective lens not facing the optical recording medium;
      (iii) an aperture configured to control a diameter of laser light to be incident on the objective lens;
      (iv) a protection portion protruding toward the optical recording medium with respect to the objective lens; and
      (v) a cut portion provided such that the cut portion faces the bonding recess and the edge portion of the objective lens that is exposed to the lens holding member from the protection member, and
   wherein, in the cut portion, the edge portion of the objective lens fits to the first fitting portion of the lens holding member, the surface of the edge portion of the objective lens not facing the optical recording medium contacts the first bearing surface, and adhesive is filled in the bonding recess.

2. An optical disk drive apparatus configured to effect at least one of reproducing of an information signal from and recording of an information signal on an optical recording medium with laser light, said optical disk drive apparatus comprising:
- a spindle motor configured to rotate the optical recording medium; and
- the optical pickup according to claim 1, the optical pickup irradiating the optical recording medium with the laser light.

3. An optical pickup comprising:
- an objective lens;
- a protection member for the objective lens; and
- a lens holding member configured to hold the objective lens and the protection member, wherein the optical pickup records an information signal on and reproduces an information signal from an optical recording medium by condensing laser light through the objective lens, wherein the lens holding member includes a first fitting portion configured to be fitted to an edge portion of the objective lens, a first bearing surface configured to contact a surface of the edge portion of the objective lens not facing the optical recording medium, and a bonding recess configured to bond the objective lens, wherein the protection member includes a second fitting portion configured to be fitted to the edge portion of the objective lens, a second bearing surface configured to contact the surface of the edge portion of the objective lens not facing the optical recording medium, an aperture configured to control a diameter of the laser light to be incident on the objective lens, a protection portion protruding toward the optical recording medium with respect to the objective lens, and a cut portion provided at a position facing the bonding recess to allow the edge portion of the objective lens to be exposed to the lens holding member from the protection member, in which the second fitting portion, the second bearing surface, the aperture, the protection portion, and the cut portion are integrally formed with one another, and wherein, in the cut portion, the edge portion of the objective lens is fitted to the first fitting portion of the lens holding member, the surface of the edge portion of the objective lens not facing the optical recording medium contacts the first bearing surface, and an adhesive is filled in the bonding recess.

4. An optical disk drive apparatus configured to rotationally drive an optical recording medium, to condense laser light onto the optical recording medium, and to effect reproducing of an information signal from and recording of an information signal on the optical recording medium with reflection light of the laser light, the optical disk drive apparatus comprising the optical pickup according to claim 3.

* * * * *